United States Patent
Perkins et al.

(10) Patent No.: US 6,723,017 B2
(45) Date of Patent: Apr. 20, 2004

(54) DIFFERENTIAL ASSEMBLY

(75) Inventors: William Paul Perkins, Dearborn, MI (US); Norman Szalony, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/142,705

(22) Filed: May 9, 2002

(65) Prior Publication Data

US 2003/0211914 A1 Nov. 13, 2003

(51) Int. Cl.$^7$ .................... F16H 48/06; F16H 48/20; F16H 48/30
(52) U.S. Cl. ............................ 475/231; 475/150
(58) Field of Search .................. 475/231, 150, 475/153, 225, 84

(56) References Cited

U.S. PATENT DOCUMENTS

| | | |
|---|---|---|
| 1,359,616 A | 11/1920 | Murray |
| 3,837,442 A | 9/1974 | Baermann |
| 4,130,172 A | 12/1978 | Moody |
| 4,163,914 A | 8/1979 | Keyes |
| 4,256,270 A * | 3/1981 | Lee et al. ............... 242/420.6 |
| 4,790,212 A * | 12/1988 | Sibeud ...................... 475/154 |
| 4,805,721 A | 2/1989 | Takashashi et al. |
| 5,007,498 A | 4/1991 | Wiese et al. |
| 5,090,531 A * | 2/1992 | Carlson ..................... 192/21.5 |
| 5,115,693 A | 5/1992 | Rugraff |
| 5,142,943 A | 9/1992 | Hughes |
| 5,263,906 A | 11/1993 | Antonov |
| 5,269,391 A | 12/1993 | Ito et al. |
| 5,322,484 A * | 6/1994 | Reuter ........................ 475/150 |
| 5,348,126 A | 9/1994 | Gao |
| 5,671,144 A | 9/1997 | Ryan et al. |
| 5,847,481 A | 12/1998 | Rugraff |
| 5,855,264 A | 1/1999 | Rugraff |
| 5,927,426 A | 7/1999 | Hall et al. |
| 6,168,545 B1 | 1/2001 | Lowell |
| 6,183,386 B1 * | 2/2001 | Duggan ....................... 475/84 |
| 6,454,674 B1 * | 9/2002 | Krzesicki et al. ............ 475/85 |
| 6,461,267 B1 * | 10/2002 | Paielli ........................ 475/150 |
| 6,464,056 B1 * | 10/2002 | Lowell et al. ................ 192/35 |

FOREIGN PATENT DOCUMENTS

| | | | |
|---|---|---|---|
| GB | 2 224 790 | 5/1990 | |
| GB | 2 336 880 | 11/1999 | |
| GB | 2 383 614 | 7/2003 | |
| JP | 63025142 A * | 2/1988 | ........... B60K/23/04 |

* cited by examiner

Primary Examiner—Tisha D Lewis
(74) Attorney, Agent, or Firm—John E. Kajander, Esq.

(57) ABSTRACT

A differential assembly 10 is provided, including a first differential side gear 24 and the second differential side gear 26. An eddy current retarder 40 is utilized to create an adjustable resistant torque between the first differential side gear 24 and the second differential side gear 26.

16 Claims, 1 Drawing Sheet

DIFFERENTIAL ASSEMBLY

TECHNICAL FIELD

The present invention relates generally to a differential gear assembly and more particularly to a differential gear assembly utilizing an Eddy-current retarder to limit relative rotation of gears.

BACKGROUND OF THE INVENTION

Differential gear assemblies are utilized to translate drive shaft rotation into left and right axle shaft rotation, which in turn provides vehicle drive at the wheels. Conventional vehicle differential assemblies allow the wheels to rotate at different rates. This is necessary during vehicle turning when the outside wheel will rotate faster than the inside wheel. This is commonly accomplished through the use of differential side gears and pinion gears located inside the differential case. The differential side gears, each splined to an axle shaft, will rotate relative to the differential case and relative to each other. This process is called differentiation, and allows the vehicle to be turned without dragging the tires along the road.

One form of differential assembly is commonly known as "open" differential. An "open" differential is a differential assembly without a torque biasing mechanism. In such a system, when the vehicle is driving straight, and a difference in road friction, or traction, exists between the right and left tires, the rotational motion of the differential is transmitted mostly to the wheel with the least grip/lower friction. It is further known that in such "open" differentials, the maximum torque delivered to both wheels is twice the torque delivered to the wheel with less traction. This means, that if one tire is placed on a low friction surface, it receives almost zero driveline torque. In addition, the other tire also receives almost zero torque, regardless of the traction available at that tire. To further exacerbate these characteristics, if the torque delivered to the wheel with the less traction exceeds the friction torque acting on the tire-road interface, the wheel slips. Since the coefficient of dynamic/sliding friction is commonly less than the static/non-sliding friction, a slipping wheel has even less traction than when it is not slipping. Thus, the torque delivered to both wheels is further reduced.

It is known that if the relative motion between the two side gears can be stopped or limited, than both wheels would be forced to rotate at the same speed as the differential, regardless of any difference in traction between the differentiated wheels. By reducing the relative motion, differentiation can be essentially stopped. Unequal amounts of torque can be sent to each wheel, proportional to the difference in traction between the two wheels. This allows the torque to be delivered where it can best be utilized. The mechanism which applies more torque to the wheel with higher traction, yet still allows differentiation, is called a torque-biasing differential.

Known torque biasing differentials often rely on a friction interface between one of the differential gears (side gear, pinion gear, or reasonable facsimile) in the differential case (the differential gear container which is attached to the ring/driven gear and receives torque from the pinion/driving gear). Although this configuration creates a torque biasing differential, it commonly has several known disadvantages. One disadvantage stems from the fact that this configuration provides passive torque bias. With passive torque bias, the bias is fixed during operation and cannot be modified or adjusted to accommodate for performance or driving conditions. A second disadvantage stems from the fact this configuration will often wear during operation. It is known that the wear (or loss of material) during operation can negatively affect or degrade the torque bias provided by this configuration. A third disadvantage of this known configuration can arise from harsh engagement or shudder (a stick/slip phenomenon) during operation. It is possible for these engagement issues to provide unacceptable NVH issues that can result in decreased customer satisfaction.

It would, therefore, be highly desirable to have an assembly for providing torque bias that could provide an active control and would reduce the wear associated with known friction interface configurations. It would additionally be highly desirable to have an assembly for providing torque bias that could reduce the engagement/NVH issues associated with friction interface designs.

SUMMARY OF THE INVENTION

It is, therefore, an object of the present invention to provide a differential assembly with active torque bias control. It is a further object of the present invention to provide a differential assembly with reduced wear and reduced engagement/NVH issues.

In accordance with the objects of the present invention, a differential assembly is provided. The differential assembly includes a first differential side gear and a second differential side gear. An Eddy-current retarder, positioned in communication with the first differential side gear and the second differential side gear, is utilized to create torque bias between the first differential side gear and the second differential side gear.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
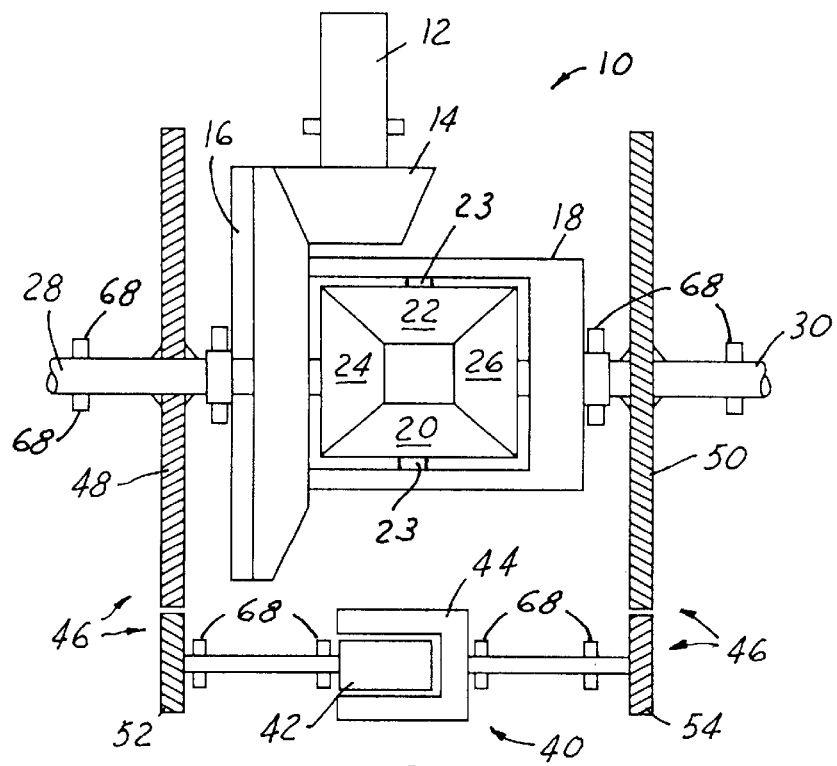
FIG. 1 is an illustration of an embodiment of a differential assembly in accordance with the present invention.

Referring now to FIG. 1, which is an illustration of an embodiment of a differential assembly in accordance with the present invention. The differential assembly 10 is intended for use in automotive applications, although a variety of alternate applications are contemplated. Furthermore, although the differential assembly 10 will be described and discussed in contexts of axles, or axles and wheels, it is should be understood that the differential assembly 10 can be applied to a wide variety of applications, including, but not limited to, transfer cases, power take-off, and a host of other rotating bodies requiring differentiated torque.

The differential assembly 10 includes an input shaft 12 in communication with a shaft pinion gear 14. As the input shaft 12 rotates, the shaft pinion gear 14 communicates with a ring gear 16 in order to transfer torque from the input shaft 12 to a differential case 18. Differential pinion gears 20, 22 positioned within the differential case 18 further transfer the torque to a first differential side gear 24 and a second differential side gear 26. The first differential side gear 24 and the second differential side gear 26 are attached to a first axle shaft 28 and a second axle shaft 30 respectively. In this fashion, torque from the input shaft 12 is transmitted to the first axle shaft 28 and the second axle shaft 30. It should be understood, that although a specific differential assembly 10 has thus far been described, a wide variety of differential configurations capable of transmitting torque from input shaft 12 to the first axle shaft 28 and the second axle shaft 30 would be obvious to one skilled in the art.

The present invention further includes an Eddy-current retarder 40 in communication with both the first differential side gear 24 and the second differential side gear 26 to limit the relative motion of the two side gears. Eddy-current retarders 40 are well-known magnetic/electromagnetic devices that utilize magnetic fields to generate torque through the action of an Eddy-current phenomenon. These devices are known and used within automotive braking systems, often as auxiliary brake systems. The present invention utilizes the Eddy-current retarder 40 as an active, controllable torque bias agent between the first differential side gear 24 and second differential side gear 26 of the differential assembly 10. Although a wide variety of embodiments of Eddy-current retarders 40 are contemplated by the present invention, in one embodiment, the Eddy-current retarder 40 includes an armature 42 positioned within a rotor 44. The Eddy-current retarder 40 can produce a range of resistant torque against the relative motion of the first differential side gear 24 and the second differential side gear 26 as a function of applied electric power to the Eddy-current retarder 40. In this fashion, the relative motion between the two side gears 24, 26 can be actively controlled with low wear and reduced NVH issues.

Although it is contemplated that the Eddy-current retarder 40 may be placed in communication with the differential side gears 24, 26 in a variety of fashions, in one embodiment, the Eddy-current retarder 40 is placed in communication through the use of a gear assembly 46. The gear assembly 46 includes a first differential gear 48 and a second differential gear 50. The first differential gear train 48 is in communication with the first differential side gear 24, preferably through connection of the first differential gear train 48 to the first axle 28. The second differential gear train 50 is in communication with the second differential side gear 26, preferably through connection of the second differential gear train 50 to the second axle shaft 30. A first retarder gear 52 is in communication with both the first differential gear train 48 and the armature 42 of the Eddy-current retarder 40. A second retarder gear 54 is in communication with both the second differential gear train 50 and the rotor 44. The gear ratio between the retarder gears 52, 54 and the differential gear trains 48, 50, can be utilized to control the rotational speed of the Eddy-current retarder 40 and thereby allow the Eddy-current retarder 40 to generate a higher resistant torque.

When power is supplied to the Eddy-current retarder 40, a resistive torque is created between the armature 42 and the rotor 44, which translates to a torque that resists the relative motion of the first differential side gear 24 and the second differential side gear 26 (or the axle shaft 28, 30). Utilizing this resistive torque, in a split traction environment, torque and motion can be transmitted to the wheel with the greatest traction. It is known that the Eddy-current retarder 40's resistant torque is often optimized at high rpms and the relative rotational speed difference between the differential side gears 24, 26 is often low during differentiation, the gear assembly 46 is preferably designed with a gear ratio that translates the low delta speed of the two differential side gears 24, 26, to a high delta speed for the Eddy-current retarder's rotor 42/armature 44. As discussed, this can allow the Eddy-current retarder 40 to generate a higher resistant torque. Further, this resistant torque is amplified by the gear assembly 26 when transmitted back to the differential side gears 24, 26.

Figure 2:
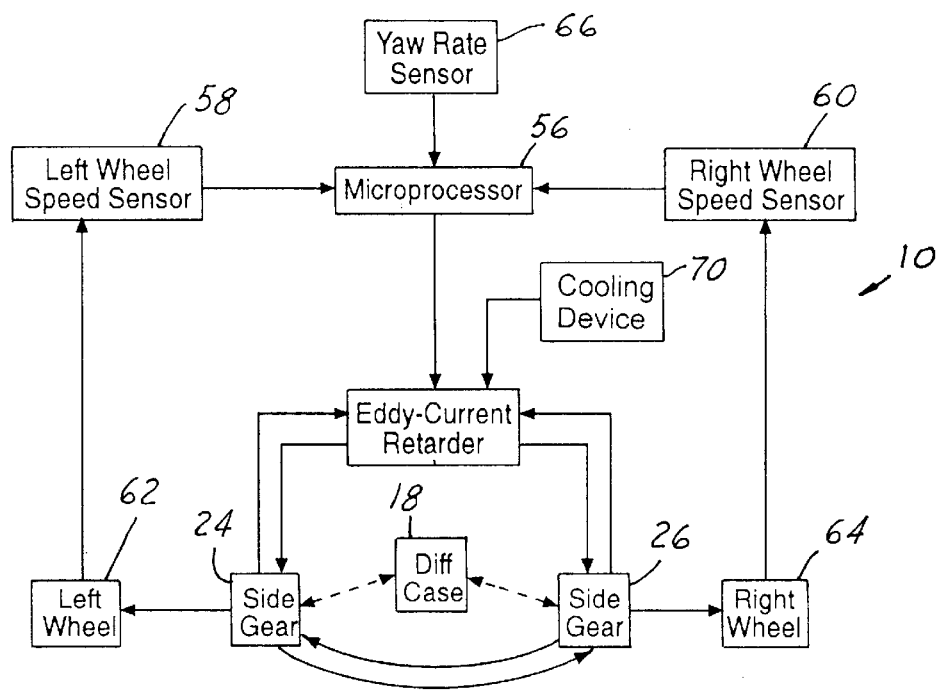
FIG. 2 is a block diagram of a differential assembly in accordance with the present invention.

Referring now to FIG. 2, which is a block diagram of a differential assembly 10 in accordance with the present invention. As discussed, the amount of resistance torque generated by the Eddy-current retarder 40 is a function of the applied electric power. It is contemplated that this power can be controlled by a microprocessor 56 or equivalent controller. When the Eddy-current retarder is off, relative motion between the differential case 18 and the differential side gears 24, 26 is unimpeded, except for the rotational inertia of the Eddy-current retarder 40 which can potentially be harnessed as a passive torque bias. The off condition is desired when turning a vehicle on a road with sufficient traction. When the Eddy-current retarder 40 is on, the resistant torque is controlled by the amount of electric power applied. It is contemplated that the present invention may further include wheel speed sensors 58, 60 in communication with the vehicle wheels 62, 64 and a yaw rate sensor 66. These sensors are well-known within the automotive industry. The wheel speed sensors 58, 60 and the yaw rate sensor 66 provide feedback to the microprocessor 56 to decide if the vehicle is turning or if the wheels 62, 64 are on a split traction surface. When the vehicle is simply turning, the microprocessor 56 can supply low or no current to the Eddy-current retarder 40 to allow differentiation. When the wheels 62, 64 are on a split traction surface, the microprocessor 56 can supply sufficient current to the Eddy-current retarder 40 to send torque to the wheel with greater traction. The resultant differential assembly 10 allows for active control of torque bias and allows the amount and degree of torque bias to be regulated based on vehicle performance or driving conditions.

Although the differential assembly 10 has been described in the context of wheels 62, 64, it should be understood that it can be applied to a transfer case, power-transfer-unit (PTU), or any other device meant to differentiate torque and motion between rotating bodies. Additionally, although one group of elements and sensors have been described, it should be understood that a wide variety of additional sensors and elements may be combined with the disclosed invention in order to supplement or improve its performance. One such additional element is contemplated to include bearing elements 68 to support the rotating components of the differential assembly 10. Although a variety of bearings may be utilized, one embodiment contemplates the use of 1-Degree-of-Freedom bearings 68 (see FIG. 1). Additionally, Eddy-current retarders 40 are known to generate heat during operation. Since the differential assembly 10 may be used in an environment intolerant of high temperatures, a cooling device 70 may also be included. A variety of cooling devices 70 such as finned housing or liquid-based cooling circuits, to name just a few, are contemplated.

While particular embodiments of the invention have been shown and described, numerous variations and alternative embodiments will occur to those skilled in the art. Accordingly, it is intended that the invention be limited only in terms of the appended claims.

What is claimed is:

1. A differential assembly comprising:
   an input shaft in communication with a shaft pinion gear;
   a ring gear in communication with said shaft pinion gear, said ring gear transferring torque from said shaft pinion gear to a differential case;

a first differential side gear in communication with said differential case, said first differential side gear transferring torque from said differential case to a first axle shaft;

a second differential side gear in communication with said differential case, said second differential side gear transferring torque from said differential case to a second axle shaft; and an eddy current retarder in communication with said first differential side gear and said second differential side gear, said eddy current retarder creating an adjustable resistant torque between said first differential side gear and said second differential side gear, said eddy current retarder comprising:
 a rotor; and
 an armature positioned within said rotor, said adjustable resistant torque created between said rotor and said armature when a current is supplied to said eddy current retarder.

2. A differential assembly as described in claim 1, further comprising:
 a microprocessor in communication with and providing control of said eddy current retarder.

3. A differential assembly as described in claim 2, further comprising:
 a first wheel speed sensor in communication with said microprocessor; and
 a second wheel speed sensor in communication with said microprocessor, said microprocessor activating said eddy current retarder when said first wheel speed sensor and said second wheel speed sensor indicate split traction driving conditions.

4. A differential assembly as described in claim 2, further comprising:
 at least one yaw rate sensor in communication with said microprocessor, said microprocessor activating said eddy current retarder when said at least one yaw rate sensor indicates split traction driving conditions.

5. A differential assembly as described in claim 1, further comprising:
 a cooling device in communication with said eddy current retarder.

6. A differential assembly as described in claim 1, further comprising:
 a plurality of bearings, said plurality of bearings reducing frictional losses of the differential assembly.

7. A differential assembly comprising:
 an input shaft in communication with a shaft pinion gear;
 a ring gear in communication with said shaft pinion gear, said ring gear transferring torque from said shaft pinion gear to a differential case;
 a first differential side gear in communication with said differential case, said first differential side gear transferring torque from said differential case to a first axle shaft;
 a second differential side gear in communication with said differential case, said second differential side gear transferring torque from said differential case to a second axle shaft;
 an eddy current retarder in communication with said first differential side gear and said second differential side gear, said eddy current retarder creating an adjustable resistant torque between said first differential side gear and said second differential side gear;
 a gear assembly comprising:
  a first differential gear train in communication with said first axle shaft;
  a second differential gear train in communication with said second axle shaft;
  a first retarder gear providing communication between said first differential gear train and said eddy current retarder; and
  a second retarder gear providing communication between said second differential gear train and said eddy current retarder.

8. A differential assembly as described in claim 7, wherein said gear assembly increases a delta speed between said first retarder gear and said second retarder gear.

9. An automotive differential assembly comprising:
 a first differential side gear;
 a second differential side gear; and
 an eddy current retarder in communication with said first differential side gear and said second differential side gear, said eddy current retarder creating an adjustable resistant torque between said first differential side gear and said second differential side gear; said eddy current retarder comprising:
  a rotor; and
  an armature positioned within said rotor, said adjustable resistant torque created between said rotor and said armature when a current is supplied to said eddy current retarder.

10. An automotive differential assembly as described in claim 9, further comprising:
 a cooling device in communication with said eddy current retarder.

11. An automotive differental assembly as described in claim 9, further comprising:
 a plurality of bearings, said plurality of bearings reducing frictional losses of the differential assembley.

12. An automotive differential assembly as described in claim 9, further comprising:
 a microprocessor in communication with and providing control of said eddy current retarder.

13. An automotive differential assembly as described in claim 12, further comprising:
 a first wheel speed sensor in communication with said microprocessor; and
 a second wheel speed sensor in communication with said microprocessor, said microprocessor activating said eddy current retarder when said first wheel speed sensor and said second wheel speed sensor indicate split traction driving conditions.

14. An automotive differential assembly as described in claim 12, further comprising:
 at least one yaw rate sensor in communication with said microprocessor, said microprocessor activating said eddy current retarder when said at least one yaw rate sensor indicates split traction driving conditions.

15. An automotive differential assembley comprising:
 a first differential side gear;
 a second differential side gear;
 an eddy current retarder in communication with said first differential side gear and said second differentail side gear, said eddy current retarder creating an adjustable resistant torque between said first differential side gear and said second differential side gear;

a gear assembly comprising:
- a first differential gear train in communication with first axle shaft;
- a second differential gear train in communication with said second axle shaft;
- a first retarder gear providing communication between said first differential gear train and said eddy current retarder; and
- a second retarder gear providing communication between said second differential gear train and said eddy current retarder.

16. An automotive differential assembly as described in claim 15, wherein said gear assembly increases a delta speed between said first retarder gear and said second retarder gear.

* * * * *